May 26, 1970  F. G. USSERY  3,513,940

HUNTER'S SEAT

Filed April 29, 1969  2 Sheets-Sheet 1

Frank G. Ussery
INVENTOR.

May 26, 1970 — F. G. USSERY — 3,513,940
HUNTER'S SEAT
Filed April 29, 1969 — 2 Sheets-Sheet 2
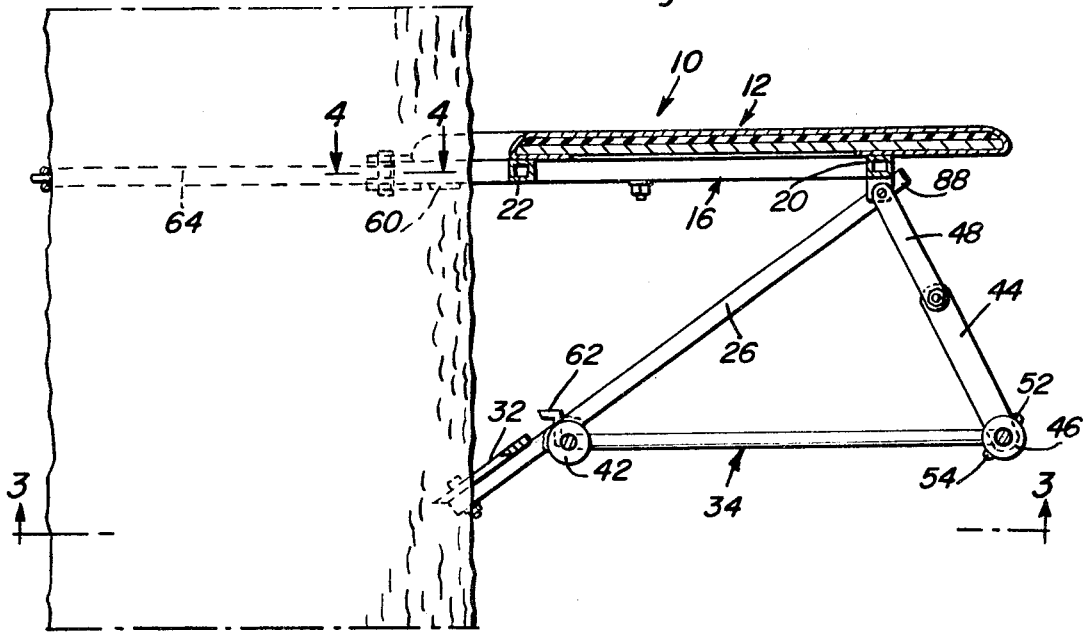
Fig. 2
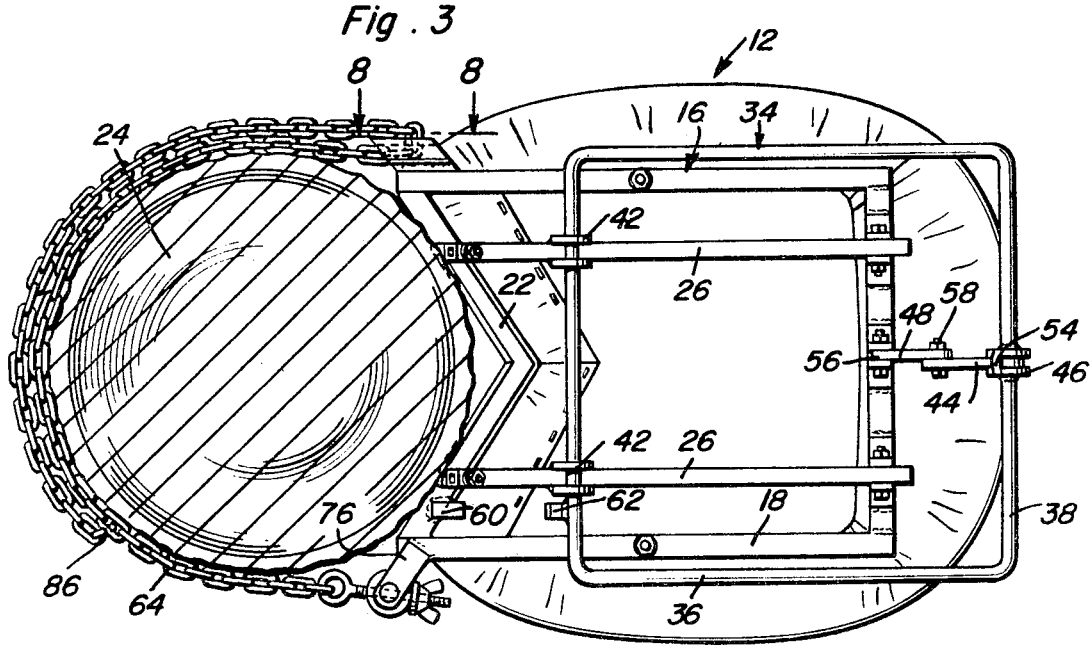
Fig. 3
Fig. 4
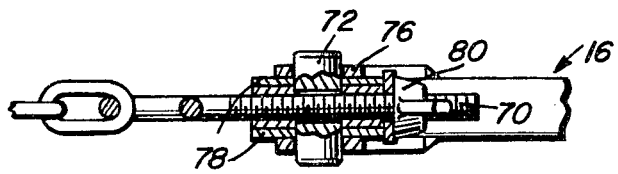
Frank G. Ussery
INVENTOR.

United States Patent Office 3,513,940
Patented May 26, 1970

3,513,940
HUNTER'S SEAT
Frank G. Ussery, 215 Jackson St.,
Warner Robins, Ga. 31093
Filed Apr. 29, 1969, Ser. No. 820,153
Int. Cl. A47c 9/10
U.S. Cl. 182—187                                13 Claims

ABSTRACT OF THE DISCLOSURE

A collapsible seat or platform selectively mountable on a tree and including a support panel having a tree embracing notch at the rear thereof and a tree encircling adjustable chain for a clamping of the panel to the tree. The seat also includes a pair of legs or braces pivotally engaged with the forward portion of the panel for a selective downward and rearward extension thereof into engagement with a tree, and a footrest extending forwardly from pivotal engagement with the lower end portions of the support legs with the forward end thereof link-connected to the forward portion of the panel.

The instant invention generally relates to a seat selectively mountable on a tree, normally for the accommodation of a hunter. More particularly, the invention herein is directed to a portable hunter's seat which, in addition to providing a highly stable unit for the accommodation of a hunter, such unit incorporating an encircling footrest, is also constructed as to be compactly collapsible into an easily carried unit.

The desirability of providing a seat which can be conveniently carried by a hunter, hiker or the like and which will attach to a tree and combine therewith in the formation of a comfortable seating means will be readily recognized, several such devices having heretofore been patented. It is a primary object of the instant invention to provide a portable and collapsible hunter's seat which incorporates significant advantages as compared to prior known seats of this type.

More particularly, it is an object of the instant invention to provide a hunter's seat which, while collapsible and portable, is, in its erected and tree mounted position, highly stable, providing a safe and secure seat incorporating not only the seating panel but also a footrest located in spaced relation therebelow, both in front of and along the opposed sides of the seating panel.

The tree seat itself includes a flat seating panel having a tree trunk encompassing notch provided at the rear thereof. A rigidifying frame underlies and mounts the panel as well as pivotally secured depending legs which also engage the tree and coact with a tree trunk encircling chain for the securing of the seat thereto. An elongated footrest, positioned so as to, in the erected position of the seat, be in vertically spaced relation below the seating panel, is hingedly engaged with the folding legs as well as a collapsible pair of links interconnecting the forward portion of the seating panel and the forward portion of the footrest. When the unit is folded, a pair of lugs on the rear portion of the footrest and the panel underlying frame interlock and the connecting links engaged between the panel and the footrest move to an overcenter position so as to positively lock the legs and footrest immediately against the undersurface of the seating panel, thereby preparing the portable seat for an easy carrying thereof either on the back of a user or in the user's hand.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an enlarged cross-sectional view taken substantially on a plane passing along line 2—2 in FIG. 1;

FIG. 3 is a cross-sectional view taken substantially on a plane passing along line 3—3 in FIG. 2;

FIG. 4 is an enlarged cross-sectional detail taken substantially on a plane passing along line 4—4 in FIG. 2;

FIG. 5 is a bottom plane view of the collapsed seat;

FIG. 6 is an enlarged cross-sectional view taken substantially on a plane passing along line 6—6 in FIG. 5;

FIG. 7 is an enlarged cross-sectional detail taken substantially on a plane passing along line 7—7 in FIG. 6;

FIG. 8 is an enlarged cross-sectional detail taken substantially on a plane passing along line 8—8 in FIG. 3; and FIG. 9 is a perspective view of the collapsed hunter's seat with the mounting chain thereof used as a sling for the suspension of the seat.

Figure 1:
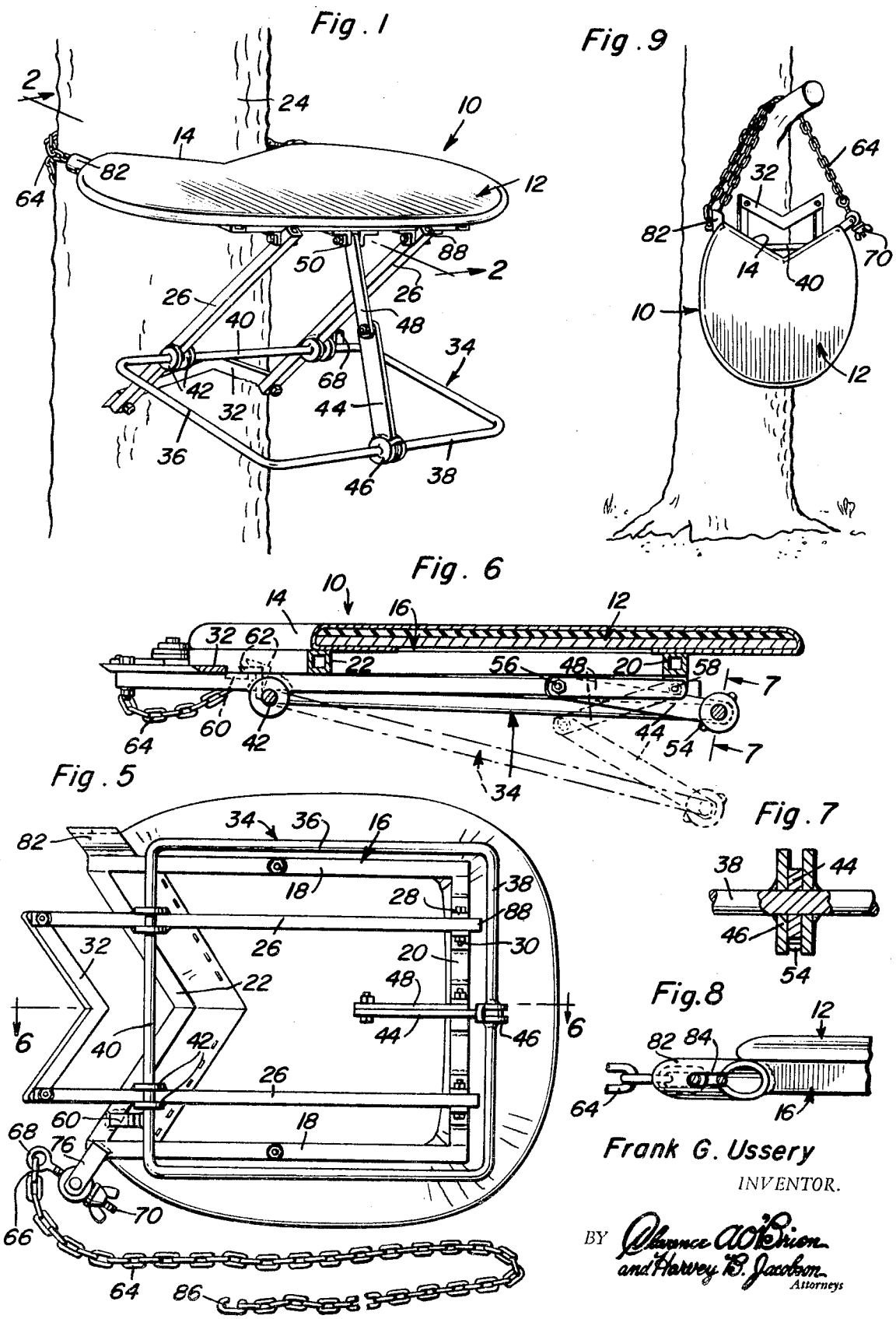
FIG. 1 is a perspective view of the erected and tree mounted hunter's seat.

Referring now more specifically to the drawings, reference numeral 10 is used to generally designate the hunter's seat comprising the instant invention. This seat 10 includes an enlarged flat seating panel 12 which, as will be appreciated from the drawings, can be padded and covered as desired. The rear edge of the seating panel 12 is in the shape of a wide angle V-notch, generally designated by reference numeral 14, while the forward corner portions of the panel 12 are smoothly rounded whereby an occupant of the seat can shift his position or swing from side to side thereon without encountering any sharp projections.

A rigid metal frame 16 underlies the panel 12 and is fixedly bolted thereto so as to provide a mounting frame and stabilizing support therefor. This frame 16 includes a pair of elongated laterally spaced side bars 18 interconnected at the forward ends thereof by a transverse bar 20 and at the rear ends thereof by a V-shaped bar 22 which extends along and directly underlies the notched rear edge 14 of the panel 12, and in fact projects slightly rearward therefrom so as to engage against a tree trunk 24 without requiring that the notched edge 14 of the panel itself engage and possibly wear against the tree trunk 24.

A pair of laterally spaced elongated rigid legs or braces 26 underlie the frame 16 and extend, in the collapsed position of the seat 10, from a point immediately forward of the transverse frame bar 20 to a point beyond the rear notched edge 14 of the panel 12. The forward portion of each of these legs 26 is pivoally mounted to the front transverse bar 20 between a pair of depending mounting ears 28 through appropriate pivot pins or bolts 30. The rear ends of the two legs or braces 26 are interconnected by a V-shaped tree engaging blade-like bar 32 which will positively cut and engage in the tree trunk 24 in a non-slipping manner. This blade-like bar 32 can actually be in the nature of a flat bar having a sharpened rearwardly directed full length edge.

A rigid rectangular rod-like footrest 34 underlies the pivotally mounted legs 26 and includes two laterally spaced side rods 36, a transverse front rod 38 and a transverse rear rod 40 connected so as to define a continuous member. The rear transverse footrest rod 40 is rotatably received through a pair of depending ears 42 on each of the legs 26 just forward of the transverse V-shaped blade bar 32 whereby a swinging of the footrest 34, relative to the legs 26, can be effected between the positions indicated in FIGS. 1 and 6.

The front transverse rod 38 of the footrest 34 pivotally receives the lower end of a connecting link 44 between a pair of rod mounted plates or washers 46. The upper end of the link 44 is in turn pivotally engaged with the lower end of a second link 48, the second link 48 having the upper end thereof pivotally mounted between a pair of depending ears 50 affixed centrally to the forward transverse frame bar 20. The pivotally connected links 44 and 48 thus constitute a collapsible supporting linkage between the front of the seating panel 12, and more particularly the support frame 16 therefor, and the forward portion of the footrest 34.

A first stop 52 is provided between the link retaining plates 46 in the path of movement of the lower link 44 so as to limit the upward and forward swinging thereof to a position whereby the links 44 and 48 are in linear alignment with each other, note for example FIG. 2, whereby a rigid connection is provided between the front of the panel supporting frame 16 and the footrest 34 and whereby a positive inward breaking of the links 44 and 48 is required so as to effect a collapsing of the unit.

A second stop 54 is also provided between the two plates 46 and so oriented, noting FIG. 6 in particular, as to engage against the lower connecting link 44 as the footrest 34 moves upwardly and the links collapse. This stop 54 precludes further rotation between the link 44 and the footrest front rod 38 whereby a positive additional physical pressure will be required to move the footrest 34 and the links 44 and 48 to the fuly collapsed full line position of FIG. 6. In this fully collapsed position, the point 56 of pivotal engagement between the links 44 and 48 actually moves overcenter relative to the point 58 of pivotal engagement between the upper link 48 and the mounting frame 16 thereby effecting a positive locking of the connecting links 44 and 48 closed for a securing of the footrest 34 against the legs 26.

This collapsing of the footrest 34 is to be effected, normally, after the legs 26 have been swung or pivoted upwardly against the frame 16. The frame 16, and more particularly the V-shaped rear transverse bar 22, includes a forwardly projecting lug 60 welded thereto in alignment with a generally similar upwardly and rearwardly offset lug 62 toward one end of the rear transverse footrest rod 40. Noting FIG. 6 in particular, when the footrest 34 is angled downwardly relative to the legs 26, the footrest mounted lug 62 is swung forwardly away from the lug 60. However, as the footrest 34 is swung upwardly upon a collapsing of the links 44 and 48, the lug 62 swings rearwardly so as to engage over the frame mounted lug 60, thereby locking the rear portion of the footrest 34 to the mounting frame 16 with the legs 26 retained therebetween. In this manner, through the lug interlock at the rear and the overcenter lock provided at the front, the footrest 34 and legs 26 are positively locked against the panel mounting frame 16 and the hunter's seat 10 retained in a flat collapsed position. The opening of the hunter's seat 10 will in turn involve merely a downward pulling on the front of the footrest 34, relative to the seating panel 12, so as to snap the connecting links 44 and 48 back overcenter with a continued downward pull on the forward portion of the footrest 34 releasing the interengaged lugs 60 and 62 so as to allow for a downward swinging of the freed legs 26.

In its opened position, the hunters seat 10 is engaged against a tree turnk 24, the trunk seating within the panel and mounting frame notches as well as in the V-shaped leg bar 32, and a retaining chain 64 looped and tightened about the trunk.

The retaining chain 64 has a first end 66 thereof engaged with the eye 68 of an elongated threaded bolt 70. The bolt 70, noting the detail of FIG. 4, is slidably received through a cross pin 72 which is in turn rotatably mounted between a pair of laterally projecting ears 76 welded to one rear corner of the mounting frame 16. A pair of bearing washers 78 are provided on the pin 72 to the opposite sides thereof inward of the mounting ears 76, and an adjusting nut 80 is threaded on the forward end of the bolt 70 into bearing engagement with the washers 78 whereby upon a manipulation of the adjusting nut 80 a selective extension and retraction of the chain 64 can be effected within the limit of the bolt 70.

The opposite near corner of the mounting frame 16 is provided with a chain receiving locking sleeve 82 through which the chain 64 is pulled after encircling the tree trunk 24. This locking sleeve includes a locking slot 84 extending inwardly from the front thereof so as to effect an actual locking of the chain 64 therein. This slot 84 is of a length and width so as to receive a link of the chain 64 when orientated horizontally therein as suggested in FIGS. 3 and 8. Thus, the chain 64 is, subsequent to encircling the tree trunk 24, inserted through the sleeve 82 and pulled tight thereagainst after which the forwardly drawn portion of the chain is swung outwardly of the sleeve 82 and the closest horizontal link to the front of the sleeve 82 is slipped into the slot 84 whereby an effective locking of the chain 64 therein is accomplished, the immediately adjacent vertical link preventing a withdrawal of the horizontal link from the slot 80. As an extra safety measure, a hook 86 can be provided on the extreme end of the chain 64 with this hook 86, noting FIG. 3, being engaged with an aligned link of the chain 64 after the forward end of the chain 64 is swung rearwardly from the locking sleeve. Thus, should there be any tendency for the slot engaged link to slip, the chain 64 will still be firmly locked about the tree trunk 24. In addition, in order to facilitate a threading of the chain through the locking sleeve 82, the first two or three links, including the hook 86 thereon, can be rigidly welded together. Once the chain 64 is looped through the locking sleeve 82 and has the extreme free end thereof hook secured, the adjusting nut 80 can be manipulated so as to effect a final tightening of the chain and a firm clamping of the panel supporting portion of the hunter's seat 10 to the tree trunk 24. With the upper portion of the hunter's seat chain clamped to the tree trunk, the lower portion thereof, that is the lower rearwardly directed ends of the legs or braces 26, are in effect locked to the tree trunk in a non-slipping manner through the transverse V-shaped blade bar 32. It will also be noted that the legs or braces 26 firmly and positively orinetate the front of the seating panel 12 which in turn horizontally suspends the footrest therebelow, thereby providing a comfortable highly stable seat upon which a user can be seated with his feet comfortably supported on the seat encircling footrest.

At this point attention is also directed to the fact that the extreme forward end portions 88 of the legs 26 project slightly forwardly of the pivotal mountings of the legs to the transverse frame bar 20 whereby upon a downward swinging of the legs 26 to their operative position, these extreme forward end portions 88 will engage against the transverse frame bar 20 and constitute a stop or limit defining the operational position of the legs 26 and ensuring a proper orientation of the legs, and the blade bar 32 thereon, so as to engage the tree trunk 24. Further, in this manner should, for example when climbing into the seat 10, the legs 26 accidentally disengage from the tree trunk 24, these legs will not swing downwardly away from the tree trunk, but merely re-engage, or rather the blade bar 32 will re-engage upon a re-positioning of the seat either under its own weight or through the introduction of a load thereon.

In conclusion, the hunter's seat actually can perform many functions other than that of a seat. For example, it can be used as a standing platform or even as a table or a support for a portable stove, lantern, or the like. Also, through the particular pivotal mounting of the components, as well as the adjustable nature of the chain, it will be recognized that the seat can be accommodated to other than perfectly vertical tree trunks.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tree mountable hunter's support comprising a top panel unit including a front edge and a rear edge, brace means hingedly engaged with said panel unit adjacent the front edge thereof and extending rearwardly therefrom, said brace means being movable between a first collapsed position paralleling said top panel unit immediately therebelow and a second extended position angled rearwardly and downwardly relative to the panel unit, footrest means hingedly engaged with said brace means toward the rear thereof, said footrest means underlying said brace means and projecting forwardly from the hinged engagement therewith, said footrest means being movable between a first collapsed position paralleling and immediately underlying the brace means in the first collapsed position thereof and a second extended position angled relative to the brace means in the second position thereof and extending forwardly generally parallel to and in spaced relation below the top panel unit, and selectively collapsible connecting means extending between the front portion of the top panel unit and the front portion of the footrest means.

2. The support of claim 1 including a flexible link chain, means connecting one end of said chain to said panel unit at one side of the rear edge portion thereof, and a sleeve lock fixed to the opposite side of the rear edge portion of the top panel unit for the selective reception of the chain, said sleeve lock having a chain receiving passage defined axially therethrough from the rear thereof to the front thereof, and a link receiving lateral slot extending inwardly from the front of the sleeve lock, said slot being of a size so as to receive a single link therein and preclude the passage therethrough of links angularly related to said single link.

3. The support of claim 2 wherein the means connecting one end of the chin comprises a pivotally mounted adjusting screw for effecting a variation in the effective length of the chain.

4. The support of claim 3 wherein the extreme second end of the chain includes a hook thereon selectively engageable with any link of the chain subsequent to a passage of the hook forwardly through the sleeve lock and rearwardly along the chain toward the initial end thereof whereby a lock supplementing the sleeve lock is effected.

5. The support of claim 4 wherein the connecting means between the top panel unit and the footrest comprises pivotally interconnected upper and lower links, the upper link being pivotally engaged with the top panel unit and the lower link being pivotally engaged with the footrest.

6. The support of claim 5 wherein said links are so interconnected as to assume a locked overcenter position upon a collapsing of the links on each other and a movement of the footrest to a position immediately underlying and parallel to the brace means.

7. The support of claim 6 including interlocking lugs, one on the top unit adjacent the rear edge thereof, and one on the rear portion of the footrest for pivotal movement therewith, said lugs interlocking upon an upward swinging of the brace means to the collapsed position thereof and a subsequent upward pivoting of the footrest means to the collapsed position thereof, the interlocking of the lugs being effected substantially simultaneously with the overcenter locking of the links whereby a positive locking of both the brace means and the footrest means to the top panel unit is effected.

8. The support of claim 7 wherein the rear edge of the top panel unit has a trunk embracing notch defined therein, the rear portion of the brace means including a transedge sharpened V-shaped connecting bar.

9. The support of claim 1 wherein the connecting means between the top panel unit and the footrest comprises pivotally interconnected upper and lower links, the upper link being pivotally engaged with the top panel unit and the lower link being pivotally engaged with the footrest.

10. The support of claim 9 wherein said links are so interconnected as to assume a locked overcenter position upon a collapsing of the links on each other and a movement of the footrest to a position immediately underlying and parallel to the brace means.

11. The support of claim 10 including interlocking lugs, one on the top panel unit adjacent the rear edge thereof, and one on the rear portion of the footrest for pivotal movement therewith, said lugs interlocking upon an upward swinging of the brace means to the collapsed position thereof and a subsequent upward pivoting of the footrest means to the collapsed position thereof, the interlocking of the lugs being effected substantially simultaneously with the overcenter locking of the links whereby a positive locking of both the brace means and the footrest means to the top panel unit is effected.

12. The support of claim 1 wherein the rear edge of the top panel unit has a trunk embracing notch defined therein, the rear portion of the brace means including a transverse edge sharpened V-shaped connecting bar.

13. The support of claim 1 wherein said panel unit comprises a flat seating panel and an underlying support frame secured thereto, said support frame including a rear frame bar generally underlying and extending along the rear edge of the panel, said frame bar projecting slightly rearward of the rear edge of the panel for engagement with a tree trunk.

References Cited
UNITED STATES PATENTS

| 2,394,203 | 2/1946 | Pruder | 182—187 |
| 2,512,174 | 6/1950 | Roeder | 182—187 |
| 3,115,213 | 12/1963 | Cloutier | 182—187 |
| 3,368,725 | 2/1968 | Martin | 182—187 |

REINALDO P. MACHADO, Primary Examiner